(12) United States Patent
Farges et al.

(10) Patent No.: US 10,890,727 B2
(45) Date of Patent: Jan. 12, 2021

(54) LIGHT MODULE FOR ILLUMINATING AN OUTER COMPONENT OF A VEHICLE, AND PROCESS FOR MANUFACTURING SUCH LIGHT MODULE

(71) Applicant: Dura Operating, LLC, Auburn Hills, MI (US)

(72) Inventors: Thomas Farges, Gometz le Chatel (FR); Francis Delavigne, Ollainville (FR)

( * ) Notice: Subject to any disclaimer, the term of this patent is extended or adjusted under 35 U.S.C. 154(b) by 0 days.

(21) Appl. No.: 16/342,282

(22) PCT Filed: Oct. 21, 2016

(86) PCT No.: PCT/EP2016/075438
§ 371 (c)(1),
(2) Date: Apr. 16, 2019

(87) PCT Pub. No.: WO2018/072853
PCT Pub. Date: Apr. 26, 2018

(65) Prior Publication Data
US 2020/0057210 A1 Feb. 20, 2020

(51) Int. Cl.
*G02B 6/42* (2006.01)
*F21S 41/39* (2018.01)
*F21S 45/48* (2018.01)

(52) U.S. Cl.
CPC .......... *G02B 6/4204* (2013.01); *F21S 41/395* (2018.01); *F21S 45/48* (2018.01); *G02B 6/424* (2013.01); *G02B 6/428* (2013.01)

(58) Field of Classification Search
CPC ...... G02B 6/4204; G02B 6/428; G02B 6/424; F21S 41/395; F21S 45/48
See application file for complete search history.

(56) References Cited

U.S. PATENT DOCUMENTS

| 6,462,476 B1 | 10/2002 | Hirschmann et al. |
| 7,621,658 B2 | 11/2009 | Grötsch et al. |

(Continued)

FOREIGN PATENT DOCUMENTS

| DE | 102009016876 A1 | 10/2010 |
| DE | 202015002754 U1 | 6/2015 |

(Continued)

OTHER PUBLICATIONS

Written Opinion & International Search Report for PCT/EP2016/075439 dated Jun. 29, 2017, 11 pages.

(Continued)

*Primary Examiner* — Anne M Hines
(74) *Attorney, Agent, or Firm* — Vivacqua Crane

(57) ABSTRACT

A light module for illuminating an outer component of a vehicle, including: a housing for fastening the light module to the vehicle; a cover mounted on the housing; an inner space delimited between the housing and the cover; a printed circuit board in the inner space; a light source on the printed circuit board and configured for emitting an illumination beam; and a light guide in the housing facing the light source and extending outside the inner space for guiding the illumination beam along the outer component; wherein the housing and the printed circuit board are provided with complementary indexing means tightly fitted relative to each other, for directly positioning the light source mounted on the printed circuit board relative to the light guide in the housing. A process for manufacturing such light module is also described.

6 Claims, 4 Drawing Sheets

(56) References Cited

U.S. PATENT DOCUMENTS

| | | |
|---|---|---|
| 8,870,426 B2 | 10/2014 | Biebl et al. |
| 2005/0270794 A1 * | 12/2005 | Okamoto ................ F21V 5/008 362/555 |
| 2007/0122084 A1 | 5/2007 | Stephen |
| 2017/0036590 A1 | 2/2017 | Stegemann et al. |
| 2018/0001815 A1 | 1/2018 | Hundt et al. |

FOREIGN PATENT DOCUMENTS

| | | |
|---|---|---|
| EP | 0975007 A1 | 1/2000 |
| JP | 2014146440 A | 8/2014 |
| JP | 2015035349 A | 2/2015 |
| WO | WO2006086563 A2 | 8/2006 |
| WO | WO2006097067 A1 | 9/2006 |
| WO | WO2011089499 A2 | 7/2011 |
| WO | WO2015154972 A1 | 10/2015 |
| WO | WO2016112897 A1 | 7/2016 |

OTHER PUBLICATIONS

Written Opinion & International Search Report for PCT/EP2016/075438 dated Jul. 14, 2017, 9 pages.
Written Opinion & International Search Report for PCT/EP2016/075442 dated Jul. 17, 2017, 8 pages.

* cited by examiner

US 10,890,727 B2

LIGHT MODULE FOR ILLUMINATING AN OUTER COMPONENT OF A VEHICLE, AND PROCESS FOR MANUFACTURING SUCH LIGHT MODULE

TECHNICAL FIELD

The disclosure concerns a light module for illuminating an outer component of a vehicle. The disclosure also concerns a process for manufacturing such light module.

BACKGROUND

In the automotive field, it is known to illuminate outer components of a vehicle for aesthetic reasons. For example, the outer components can be strips extending along the profile of the vehicle body, such as strips mounted around lateral doors, rear trunk and/or rear windshield.

The illumination can be activated in specific conditions, such as braking, doors locking, night detection, or manual control from the dashboard. The illumination can be activated with a specific program, such as intermittent lighting with a predetermined pattern and at a predetermined tempo, or permanent lighting in darkness.

As non-limitative examples, automotive lighting devices are disclosed in documents WO2006086563, WO2015154972 and WO2016112897.

SUMMARY

The aim of the disclosure is to provide a light module for illuminating an outer component of a vehicle.

To this end, the disclosure concerns a light module for illuminating an outer component of a vehicle, the light module comprising: a housing for fastening the light module to the vehicle; a cover mounted on the housing; an inner space delimited between the housing and the cover; a printed circuit board mounted in the inner space; a light source mounted on the printed circuit board and configured for emitting an illumination beam; and a light guide mounted in the housing facing the light source and extending outside the inner space for guiding the illumination beam along the outer component. The housing and the printed circuit board are provided with complementary indexing means tightly fitted relative to each other, for directly positioning the light source mounted on the printed circuit board relative to the light guide mounted in the housing.

Thus, the disclosure allows a precise positioning of light source relative to light guide, without influence of manufacturing tolerances of housing, cover and board, and without influence of eventual assembly shifts between housing, cover and board.

The position of the light source relative to the indexing means provided on the board is known with great precision. The position of the light guide relative to the indexing means provided on the housing is also known with great precision. The indexing means are fitted without clearance between them. Thus, the light source can be positioned with great precision relative to the light guide.

According to further aspects of the disclosure which are advantageous but not compulsory, such a light module may incorporate one or several of the following features:

The light guide includes an optical fiber extending outside the inner space and a lens positioned between the light source and an entry opening of the optical fiber, such that the illumination beam emitted by the light source is focalized toward the entry opening of the optical fiber.

The lens has a specific convergent shape, entirely focalizing the illumination beam on a focus point at the entry opening of the optical fiber.

The complementary indexing means are constituted by two lugs belonging to the housing and two complementary apertures formed through the printed circuit board.

The complementary indexing means have circular transversal sections.

The complementary indexing means have non-circular transversal sections.

The complementary indexing means are constituted by one lug belonging to the housing and one complementary aperture formed through the printed circuit board, said complementary indexing means having non-circular transversal sections.

The disclosure also concerns a process for manufacturing a light module as mentioned here-above. The process includes the following steps:

a) manufacturing the housing provided with indexing means,
b) manufacturing the printed circuit board provided with indexing means complementary to the indexing means of the housing,
c) fastening the light guide to the housing,
d) fastening the light source to the printed circuit board,
e) mounting the printed circuit board relative to the housing, by tightly fitting the complementary indexing means relative to each other.

BRIEF DESCRIPTION OF THE DRAWINGS

Certain embodiments of the invention will now be explained in correspondence with the annexed figures, and as an illustrative example, without restricting the object of the invention. In the annexed figures.

DETAILED DESCRIPTION

Figure 1:
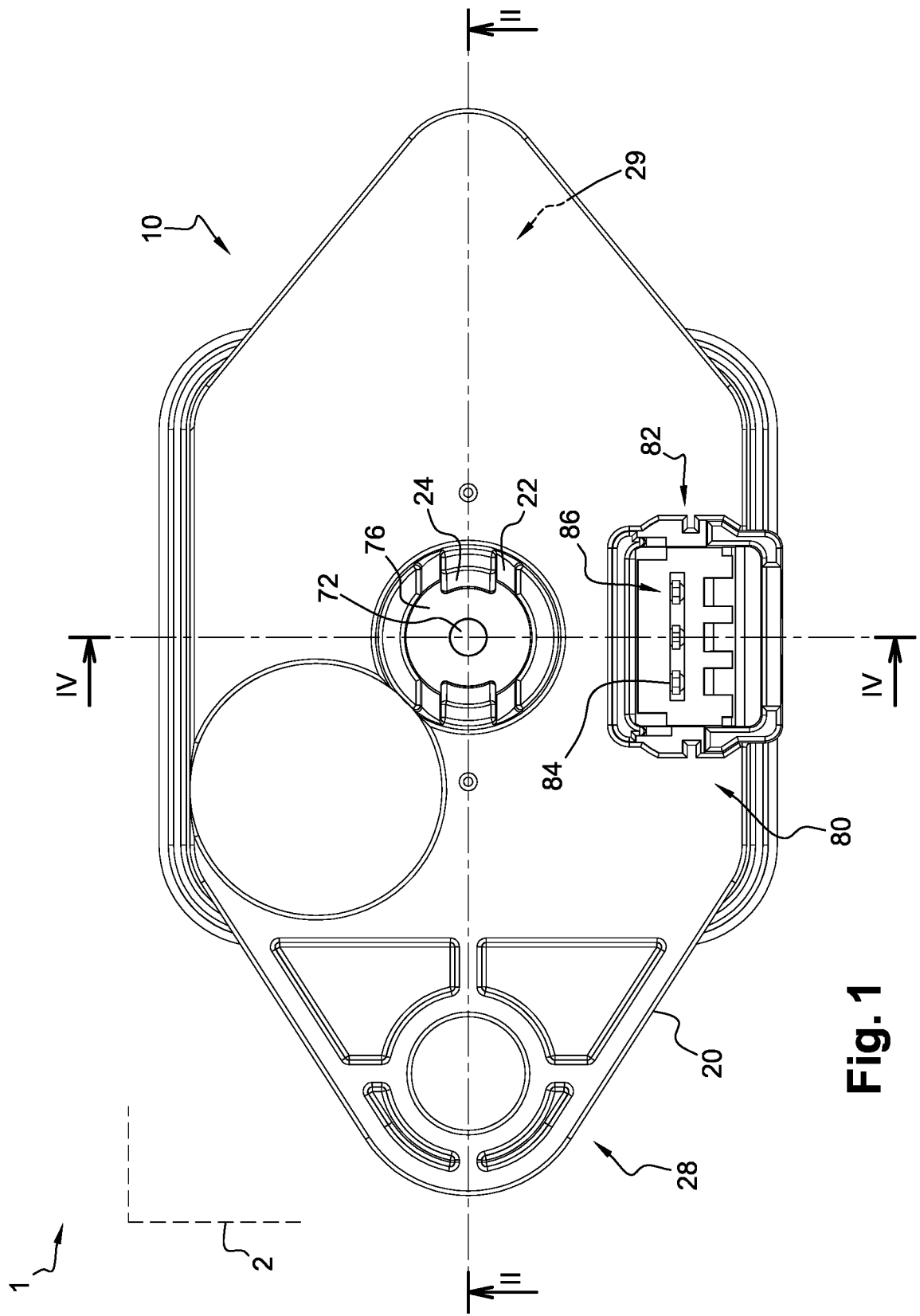
FIG. 1 is an upper view of a light module.
Figure 2:
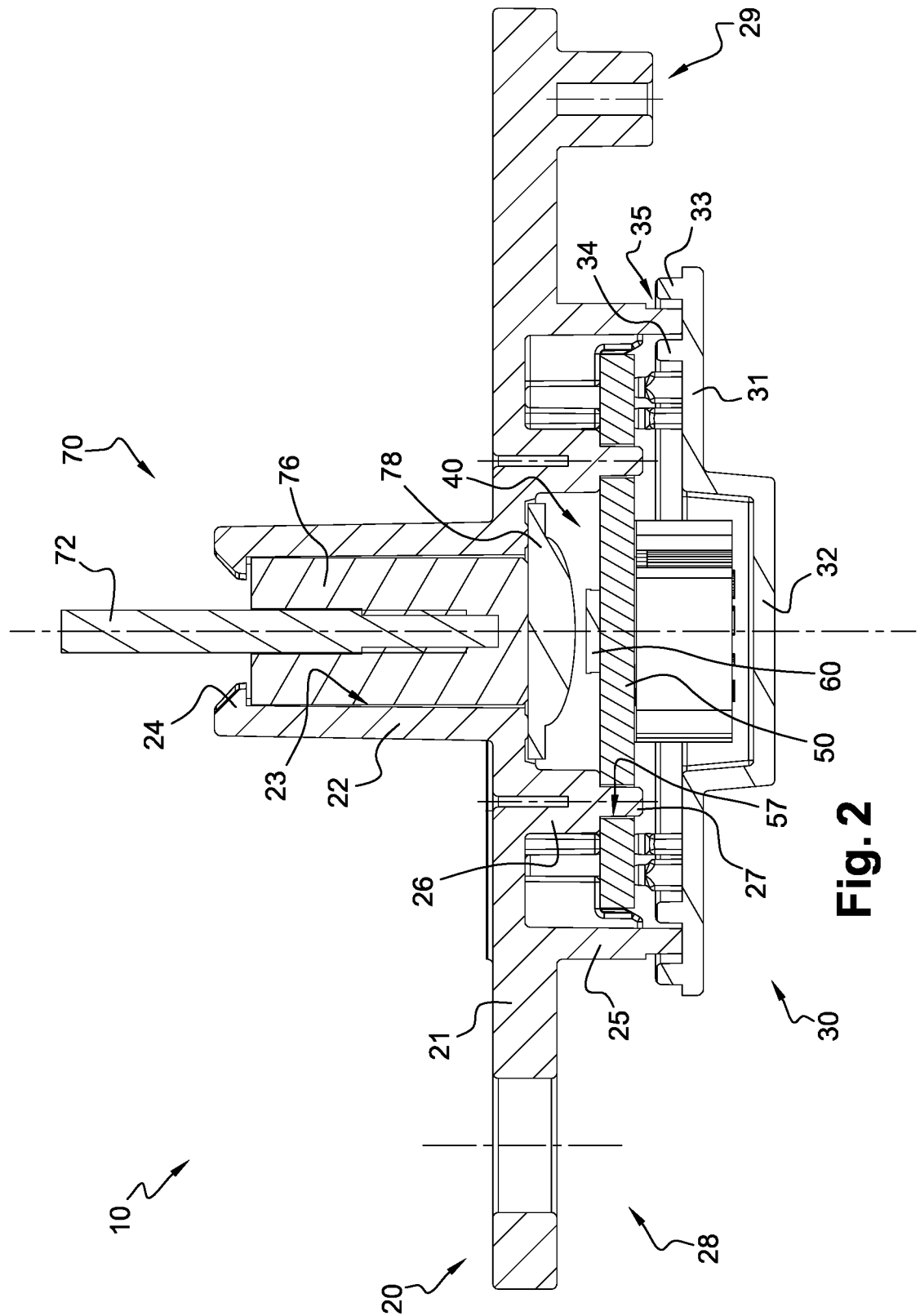
FIG. 2 is a sectional view of the light module along line II-II of FIG. 1.
Figure 3:
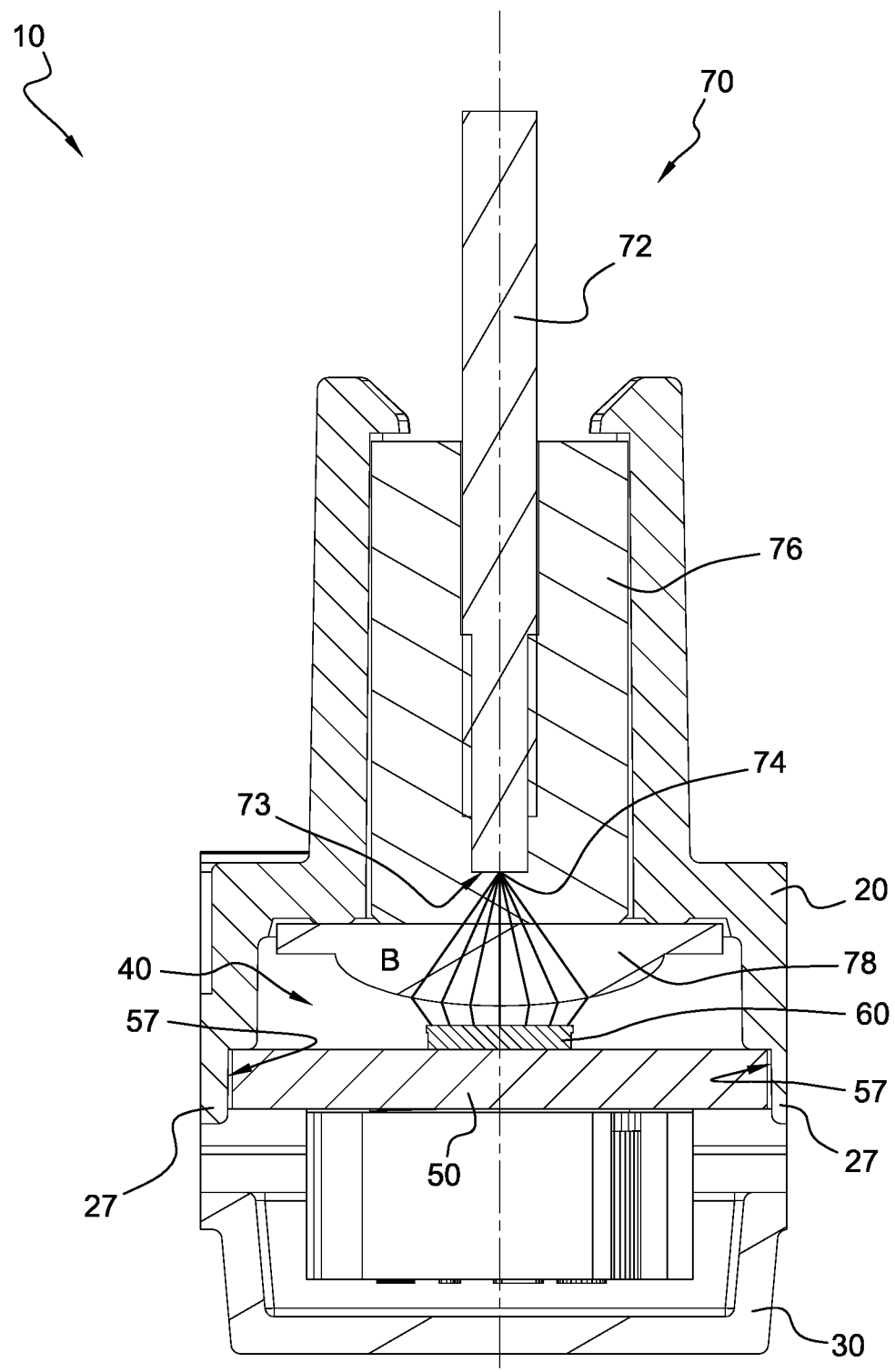
FIG. 3 is a partial sectional view, at a larger scale, of a detail from FIG. 2.

FIGS. 1 to 3 show a light module 10.

Module 10 is designed for illuminating an outer component 2 of a vehicle 1, partly and schematically showed only on FIG. 1 for simplification purpose.

Module 10 comprises a housing 20, a cover 30, a printed circuit board 50, a light source 60, a light guide 70, and a connection system 80. Housing 20 and cover 30 delimit a watertight inner space 40 between them. Space 40 receives PCB 50, on which source 60 is mounted. Guide 70 is mounted in housing 20, facing source 60.

Housing 20 is designed for fastening module 10 to vehicle 1, preferably directly to component 2. Housing 20 is also designed for receiving guide 70, PCB 50, then cover 30 to close space 40.

Housing 20 comprises a main body 21 shaped has an elongated plate. Housing 20 comprises a protrusion 22 formed on the outer side of body 21 and walls 25 formed on the inner side of body 21.

Protrusion 22 has a tubular shape and delimits a hollow recess 23 for receiving part of guide 70. Recess 23 is open opposite cover 30, such that guide 70 can extend outside module 10. Opposite cover 30, the outer end of protrusion 22 is provided with hooks 24 for retaining guide 70 in recess 23.

Walls 25 extend perpendicular to body 21 and along a square profile having curved angles. Walls 25 delimit space 40 together with body 21 and cover 30. Inside space 40, two separate stems 26 extend perpendicular to body 21. Opposite body 21, each stem 26 has an end portion forming a lug 27 of reduced diameter. Lugs 27 are designed for tight fitting into complementary apertures 57 formed in PCB 50, as detailed here-below.

Opposed ends of body 21 are provided with fastening means 28 and 29, namely a bore 28 and a reamed portion 29. Means 20 are used to fasten housing 20 to a support element, which may belong to component 2.

Cover 30 is mounted on housing 20 for closing space 40, after PCB 50 has been positioned therein.

Cover 30 comprises a main body 31 shaped has an elongate plate, a central boss 32 formed on the outer side of cover 30 and two inner walls 33 and 34 formed on the inner side of body 31. Each wall 33 and 34 extends along a square profile having curved angles. Between walls 33 and 34 is delimited an assembly path 35 for receiving walls 25.

Housing 20 and cover 30 are watertight sealed relative to each other at the junction of walls 25 and assembly path 35, for example by ultrasonic or laser welding.

PCB 50 is fastened to housing 20 inside space 40. PCB 50 is provided with conductive tracks and connection holes, not shown for simplification purpose. PCB 50 is designed for mechanically supporting and electrically connecting electronic components, such as source 60 and system 80.

Housing 20 and PCB 50 are provided with complementary indexing means 27 and 57 tightly fitted relative to each other, for directly positioning source 60 mounted PCB 50 relative to guide 70 mounted in housing 20.

Indexing means 27 and 57 allow a precise positioning of source 60 relative to guide 70, without influence of manufacturing tolerances of housing 20, cover 30 and PCB 50, and without influence of eventual assembly shifts between housing 20, cover 30 and board 50. The position of source 60 relative to indexing apertures 57 provided on PCB 50 is known with great precision. The position of guide 70 relative to indexing lugs 27 provided on housing 20 is also known with great precision. The indexing means 27 and 57 are fitted without clearance between them. Thus, source 60 can be positioned with great precision relative to guide 70, in particular to entry opening 73 and focus point 74.

On the examples of the figures, indexing means 27 and 57 have complementary circular transversal sections. Alternately, indexing means 27 and 57) can have complementary non-circular transversal sections.

According to a particular embodiment not shown, indexing means 27 and 57 can be constituted by only one lug 27 ad one aperture 57. In this case, indexing means 27 and 57 have non-circular transversal sections.

According to another particular embodiment not shown, indexing means 27 and 57 can be constituted by at least one aperture formed in housing 20 and at least one lug belonging to PCB 50.

Light source 60 may be a light-emitting diode. Source 60 is configured for emitting an illumination beam B, for example within a cone having an apex angle of 100 degrees. Source 60 is fixedly mounted on PCB 50. For example, source 60 is provided with connection pins inserted in holes of PCB 50.

Light guide 70 is mounted in housing 20 facing source 60. Guide 70 extends at least partly outside space 40 for guiding beam B along component 2.

Guide 70 comprises an optical fiber 72, an abutment 76 and a lens 78.

Fiber 72 extends outside space 40 for guiding beam B along component 2. Fiber 72 has a diameter of approximately 2 or 3 millimeters. Fiber 72 has an inner end provided with an entry opening 73 facing source 60. Fiber 72 has an outer end not shown on the figures for simplification purpose. Beam B enters through opening 73 and is guided along fiber 72.

Abutment 76 has a cylindrical shape and is made of a transparent material. Inner end and entry opening 73 of fiber 72 are integrated inside abutment 76, for example by screwing, clipping or overmolding. Abutment 76 is positioned in recess 23, with hooks 24 in retaining contact with its outer surface.

Lens 78 is positioned between source 60 and opening 73, such that beam B emitted by source 60 is focalized toward opening 73. Lens 78 may have a specific convergent shape, entirely focalizing beam B on a focus point 74 located at the precise center of opening 73. Lens 78 is transparent, while housing 20 and cover 30 may be opaque, thus ensuring that beam B it transmitted outside module 10 only through guide 70.

Thanks to the configuration of light guide 70, the loss of illumination flow between light source 60 and optical fiber 72 can be greatly and easily reduced, inducing a lower electric consumption and higher durability of light source 60.

Connection system 80 is designed for connecting PCB 50 to another device outside module 10, for example the electronic control unit of vehicle 1. System 80 is described in more details here below in reference to FIG. 4.

The disclosure also concerns a process for manufacturing module 10. Said process comprises several steps, including the following steps a), b), c), d) and e).

Step a) consists in manufacturing housing 20 provided with indexing means 27.

Step b) consists in manufacturing PCB 50 provided with indexing means 57 complementary to the indexing means 27 of housing 20.

Step c) consists in fastening light guide 70 to housing 20.

Step d) consists in fastening light source 60 to PCB 50.

Step e) consists in mounting PCB 50 relative to housing 20, by tightly fitting the complementary indexing means 27 and 57 relative to each other.

Step a) is prior to step c), while step b) is prior to step d). Steps c) and d) may be prior to step e).

Figure 4:
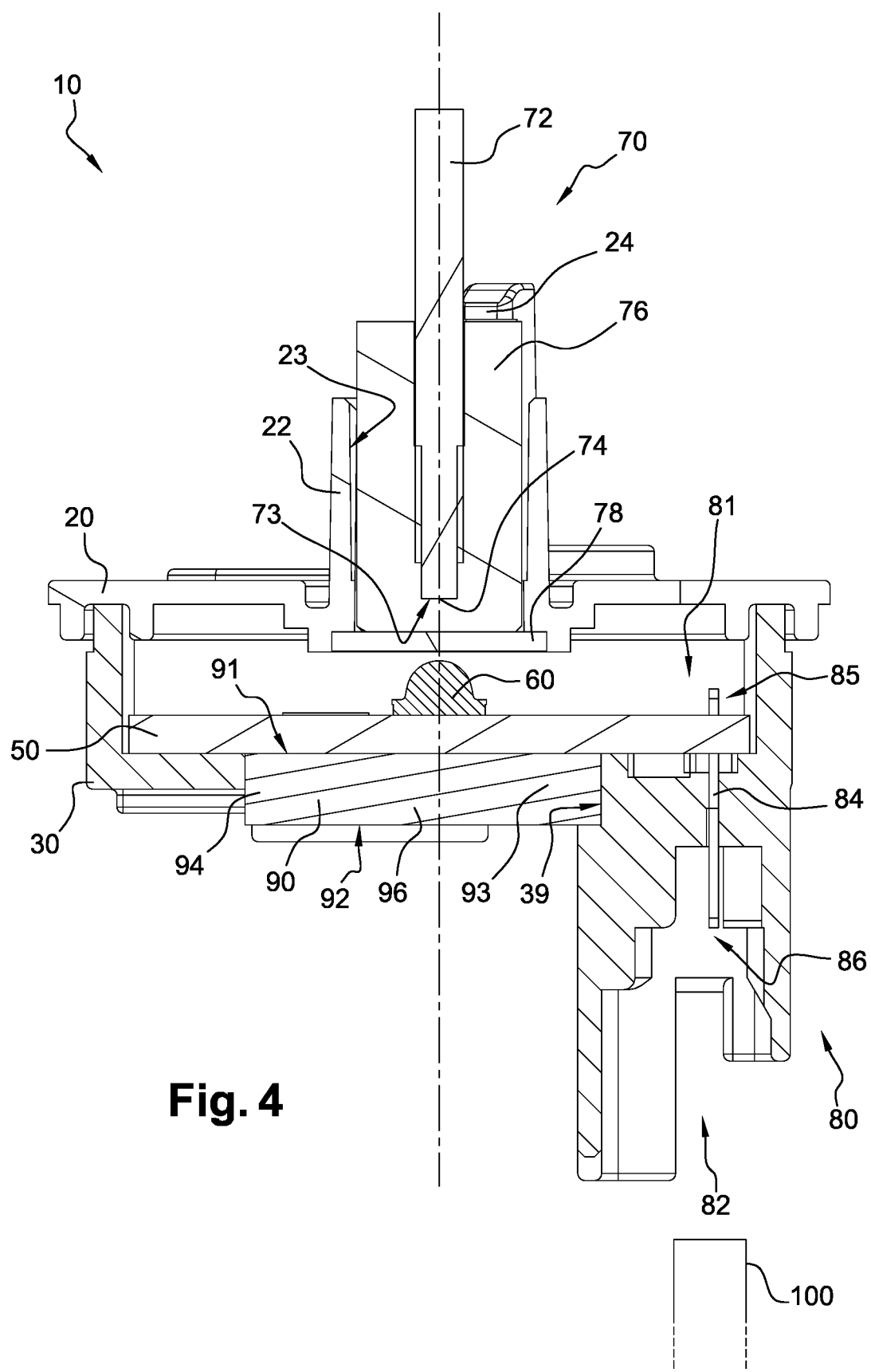
FIG. 4 is a sectional view of a second embodiment of a light module, along line IV-IV of FIG. 1.

A second embodiment of module 10 is represented on FIG. 4. In this embodiment, elements similar to the first embodiment have the same references and work in the same way. Only the differences with respect to the first embodiment are described hereafter.

In this embodiment, module 10 is provided with a heat-sink insert 90 integrated to cover 30, for example by overmolding, or any other suitable technique. While housing 20 and cover 30 are made of plastic materials, insert 90 is made of metal so as to have good heat conduction. Insert 90 may be made of aluminum alloy, for a good compromise between heat conduction, weight and cost. Insert 90 may be a rectangular parallelepiped, easy and cheap to manufacture.

Insert 90 has an inner surface 91 positioned in contact with PCB 50 and an outer surface 92 extending outside space 40, in contact with ambient air.

Thus, the heat emitted by source 60 is transferred onto heatsink insert 90 via PCB 50. This provides cooling of module 10 and prevents source 60 from overheating and overaging.

Insert 90 has two lateral portions 93 and 94 separated by a central portion 96. Portion 93 is encased in a recess 39 of the cover 30. Said recess 39 forms an abutment opposite PCB 50.

For improved efficiency, source 60 is mounted on PCB 50 precisely opposite insert 90. Source 60 may be mounted on PCB 50 opposite central portion 96 of insert 90.

System 80 has an inner portion 81 provided with a male configuration and fitted into PCB 50. System 80 has an outer portion 82 provided with a female configuration, designed to receive a connector plug 100, schematically and partly shown on FIG. 4.

System 80 comprises at least one pin 84 extending through cover 30, between portions 81 and 82. Pin 84 has a first end 85 projecting in inner portion 81 and connected to PCB 50. Pin 84 has a second end 86 projecting in portion 82 and located outside cover 30. As shown on the figures, system 80 may comprise several pins 84 extending through cover 30.

Watertight sealing of cover 30 in the area of system 80 is provided by fitting or overmolding of pins 84 through cover 30.

Alternately, cover 30 can be provided with holes having the dimensions of pins 84, ready to be traversed by pins 84, which are then welded on PCB 50. Consequently, cover 30 is not watertight near pins 84.

In this configuration, watertight sealing of module 10 and space 40 is ensured when plug 100 is fitted into the female socket of portion 82. Outer ends 86 of pins 84 are received in plug 100, while outer surfaces of plug 100 are tightly fitted in portion 82.

Other non-shown embodiments of a light module 10 can be implemented within the scope of the invention. In addition, technical features of the different embodiments can be, in whole or part, combined with each other. Thus, light module 10 and its manufacturing process can be adapted to the specific requirements of the application.

The invention claimed is:

1. A light module for illuminating an outer component of a vehicle, the light module comprising:
a housing for fastening the light module to the vehicle;
a cover mounted on the housing;
an inner space delimited between the housing and the cover;
a printed circuit board mounted in the inner space;
a light source mounted on the printed circuit board and configured for emitting an illumination beam; and
a light guide mounted in the housing facing the light source and extending outside the inner space for guiding the illumination beam along the outer component;
wherein the housing and the printed circuit board are provided with complementary indexing means tightly fitted relative to each other, for directly positioning the light source mounted on the printed circuit board relative to the light guide mounted in the housing, and
wherein the light guide includes an optical fiber extending outside the inner space and a lens positioned between the light source and an entry opening of the optical fiber such that the illumination beam emitted by the light source is focalized toward the entry opening of the optical fiber.

2. The light module according to claim 1, wherein the lens has a specific convergent shape, entirely focalizing the illumination beam on a focus point at the entry opening of the optical fiber.

3. A light module for illuminating an outer component of a vehicle, the light module comprising:
a housing for fastening the light module to the vehicle;
a cover mounted on the housing;
an inner space delimited between the housing and the cover;
a printed circuit board mounted in the inner space;
a light source mounted on the printed circuit board and configured for emitting an illumination beam; and
a light guide mounted in the housing facing the light source and extending outside the inner space for guiding the illumination beam along the outer component;
wherein the housing and the printed circuit board are provided with complementary indexing means tightly fitted relative to each other, for directly positioning the light source mounted on the printed circuit board relative to the light guide mounted in the housing, and
wherein the complementary indexing means are constituted by two lugs belonging to the housing and two complementary apertures formed through the printed circuit board.

4. The light module according to claim 3, wherein the complementary indexing means have circular transversal sections.

5. The light module according to claim 3, wherein the complementary indexing means have non-circular transversal sections.

6. A light module for illuminating an outer component of a vehicle, the light module comprising:
a housing for fastening the light module to the vehicle;
a cover mounted on the housing;
an inner space delimited between the housing and the cover;
a printed circuit board mounted in the inner space;
a light source mounted on the printed circuit board and configured for emitting an illumination beam; and
a light guide mounted in the housing facing the light source and extending outside the inner space for guiding the illumination beam along the outer component;
wherein the housing and the printed circuit board are provided with complementary indexing means tightly fitted relative to each other, for directly positioning the light source mounted on the printed circuit board relative to the light guide mounted in the housing, and
wherein the complementary indexing means are constituted by one lug belonging to the housing and one complementary aperture formed through the printed circuit board, said complementary indexing means having non-circular transversal sections.

* * * * *